United States Patent [19]

Smeenge et al.

[11] Patent Number: 4,616,798
[45] Date of Patent: Oct. 14, 1986

[54] ADJUSTABLE SUPPORT FOR CRT KEYBOARD

[75] Inventors: Paul A. Smeenge, Cascade Township, Kent County; Harold R. Wilson, Holland Township, Ottawa County; Randy P. Nelsen, Wyoming, all of Mich.

[73] Assignee: Haworth, Inc., Holland, Mich.

[21] Appl. No.: 706,231

[22] Filed: Feb. 26, 1985

Related U.S. Application Data

[63] Continuation of Ser. No. 386,131, Jun. 7, 1982, abandoned.

[51] Int. Cl.$^4$ .............................................. A47F 5/00
[52] U.S. Cl. ................................. 248/281.1; 248/293; 248/279; 108/69; 108/75
[58] Field of Search ..................................... 312/27–28

[56] References Cited

U.S. PATENT DOCUMENTS

| Re. 13,832 | 11/1914 | Vaaler . | |
|---|---|---|---|
| 213,775 | 4/1879 | Rednan et al. | 248/281.1 |
| 491,610 | 2/1893 | Stuck | 248/276 |
| 651,539 | 6/1900 | Warren | 248/276 X |
| 719,625 | 2/1903 | Throm . | |
| 934,861 | 9/1909 | Vaaler . | |
| 967,877 | 8/1910 | Bauer | 248/281.1 |
| 973,325 | 10/1910 | Waring | 108/69 X |
| 1,013,943 | 1/1912 | Kuenboldt | 248/298 X |
| 1,037,627 | 9/1912 | Hunter . | |
| 1,061,707 | 5/1913 | Vaaler . | |
| 1,072,121 | 9/1913 | Hunter . | |
| 1,122,372 | 12/1914 | Duncan . | |
| 1,480,484 | 1/1924 | Wertz | 248/291 X |
| 1,532,715 | 4/1925 | Petrarca | 108/75 |
| 1,606,975 | 11/1926 | Tobey . | |
| 2,251,198 | 7/1941 | Oneal . | |
| 2,524,386 | 10/1950 | Johnston . | |
| 2,541,075 | 2/1951 | Koch . | |
| 2,678,862 | 5/1954 | Paliuca . | |
| 2,710,782 | 6/1955 | Chaft . | |
| 2,710,783 | 6/1955 | Chaft . | |
| 3,003,838 | 10/1961 | Chaft . | |
| 3,425,761 | 2/1969 | Schreyer . | |
| 3,516,343 | 6/1970 | Tunney | 95/82 |
| 3,550,976 | 12/1970 | Rauser . | |
| 3,652,143 | 3/1972 | Wener . | |
| 3,891,301 | 6/1975 | Heller | 350/85 |
| 4,402,481 | 9/1983 | Sasaki | 248/276 |

FOREIGN PATENT DOCUMENTS

| 0010491 | 4/1980 | European Pat. Off. . |
| 0038068 | 10/1981 | European Pat. Off. . |
| 0046225 | 2/1982 | European Pat. Off. . |
| 2847135 | 5/1980 | Fed. Rep. of Germany . |

Primary Examiner—Ramon S. Britts
Assistant Examiner—Sarah A. Lechok Eley
Attorney, Agent, or Firm—Flynn, Thiel, Boutell & Tanis

[57] ABSTRACT

An adjustable auxiliary work surface assembly which includes a shelflike auxiliary work surface which is suitably connected to one end of a linkage, specifically a parallelogram linkage. The other end of this linkage is in turn connected to a carriage which is suitably rollingly supported within horizontally elongated guide rails, the latter being fixedly secured to the underside of a primary work surface. The parallelogram linkage enables the auxiliary work surface to be vertically swung upwardly and downwardly. This parallelogram linkage has a manually actuated lock so that the operator can lock the linkage at any selected elevation of the auxiliary work surface. In addition, the carriage can be rollingly moved so as to position the auxiliary work surface in a desired use position adjacent the edge of the primary work surface. Vertical hinge structures are preferably provided adjacent the opposite ends of the linkage assembly so that the auxiliary work surface can be tilted relative to the primary work surface.

38 Claims, 10 Drawing Figures

ADJUSTABLE SUPPORT FOR CRT KEYBOARD

This application is a continuation of U.S. Ser. No. 386,131, filed June 7, 1982, now abandoned.

FIELD OF THE INVENTION

This invention relates to an improved auxiliary work support surface, such as for supporting the keyboard of a CRT unit thereon, which auxiliary work surface can be adjustably moved to permit convenient selective positioning of same when in a use position.

BACKGROUND OF THE INVENTION

Small computers are being extensively utilized in many industries and offices, and such computers normally employ a screen (conventionally referred to as a CRT) and a keyboard, the latter generally being separate from the CRT to permit the operator to move same about. These conventional units often are relatively deep so that a conventional desk or work surface often is generally not convenient for the positioning and using of the computer. Further, most operators prefer to independently adjust the elevation of the keyboard and screen to accommodate their own comfort and convenience. At the present time, most such computers are utilized on specialized free-standing desk units which have a separate lower or auxiliary surface for the keyboard. These known desk units oftentimes permit limited adjustability of the auxiliary surface by use of complex mechanisms and manipulations. In addition, these units are relatively expensive, require purchase of a specialized piece of equipment which is suitable solely for this use, and require substantial space.

In an attempt to provide a more flexible structure for use with such computers, one manufacturer has provided a standard work surface of the type which mounts on a space divider panel, and this work surface is provided with a drawer thereunder which pulls out so as to permit support of the keyboard thereon. However, this arrangement does not provide the operator with optimum flexibility in that the elevation of the keyboard can not be adjusted relative to the CRT unit as supported on the main work surface.

Accordingly, it is an object of this invention to provide an improved auxiliary work support surface which is particularly suitable for mounting thereon the keyboard of a CRT unit, which auxiliary work support surface overcomes the disadvantages associated with prior structures.

More specifically, it is an object of this invention to provide an improved auxiliary work support surface which can be readily attached to and in fact retrofitted onto a conventional primary work surface, with the auxiliary work surface being readily movable between a storage position beneath the primary work surface and a use position spaced forwardly of the primary work surface. With this improved auxiliary work surface of the present invention, the auxiliary work surface can be selectively moved about when in the use position so that the operator can selectively vary the position of the auxiliary work surface both elevationally and horizontally relative to the primary work surface to thereby provide the operator with proper and most convenient positioning of the keyboard which is positioned on the auxiliary work surface.

It is a further object of the invention to provide an improved auxiliary work surface, as aforesaid, supported by a mechanism which employs multiple vertical pivots to permit the auxiliary surface to be angularly or laterally displaced.

It is also an object of the invention to provide an improved auxiliary work surface, as aforesaid, which employs a very simple support and movement mechanism so that the complete auxiliary work surface assembly can be manufactured and assembled onto a conventional primary work surface with minimal expense and effort, while at the same time providing the operator with greatly increased flexibility as to the use, movement and positioning of the auxiliary work surface. This improved assembly also contains appropriate control and safety features so as to insure that the auxiliary work surface can be moved into its storage position only when in its lowermost elevation so as to prevent the keyboard from being accidentally pushed off of the auxiliary work surface, and at the same time properly and safely permitting the keyboard to be stored in this closed position at a location beneath the primary work surface.

According to the present invention, there is provided an adjustable auxiliary work surface assembly which includes a shelflike auxiliary work surface which is suitably connected to one end of a linkage, specifically a parallelogram linkage. The other end of this linkage is in turn connected to a carriage which is suitably rollingly supported within horizontally elongated guide rails, the latter being fixedly secured to the underside of a primary work surface, such as a conventional work surface of the type which is removably attached to and projects horizontally outwardly from a vertical space divider panel. The parallelogram linkage enables the auxiliary work surface to be vertically swung upwardly and downwardly from an upper position wherein it is substantially flush with the primary work surface, and a lower position wherein it is spaced downwardly a substantial distance therebelow, which distance is sufficient to accommodate a keyboard unit thereon at an elevation disposed entirely below the primary work surface. This parallelogram linkage has a suitable manually actuated lock conveniently associated therewith so that the operator can lock the linkage at any selected elevation of the auxiliary work surface. In addition, the carriage can be rollingly moved inwardly or outwardly so as to position the auxiliary work surface in a use position spaced forwardly from the front edge of the primary work surface, and a storage position wherein the auxiliary work surface is disposed entirely beneath the primary work surface. A suitable control structure is provided for permitting the auxiliary work surface to be moved into the storage position only when the auxiliary work surface is in its lowermost elevation. The permissible movement of the carriage is such that the auxiliary work surface, when in its use position, can be moved inwardly or outwardly through a limited extent relative to the front edge of the primary work surface. Further, appropriate vertical hinge structures are preferably provided adjacent the opposite ends of the linkage assembly so that the auxiliary work surface can be positioned at an angle relative to the primary work surface if desired, or alternately can be displaced laterally sidewardly while still maintaining a parallel relationship with the primary work surface.

Other objects and purposes of the invention will be apparent to persons familiar with structures of this general type upon reading the following specification and inspecting the accompanying drawings.

Figure 1:
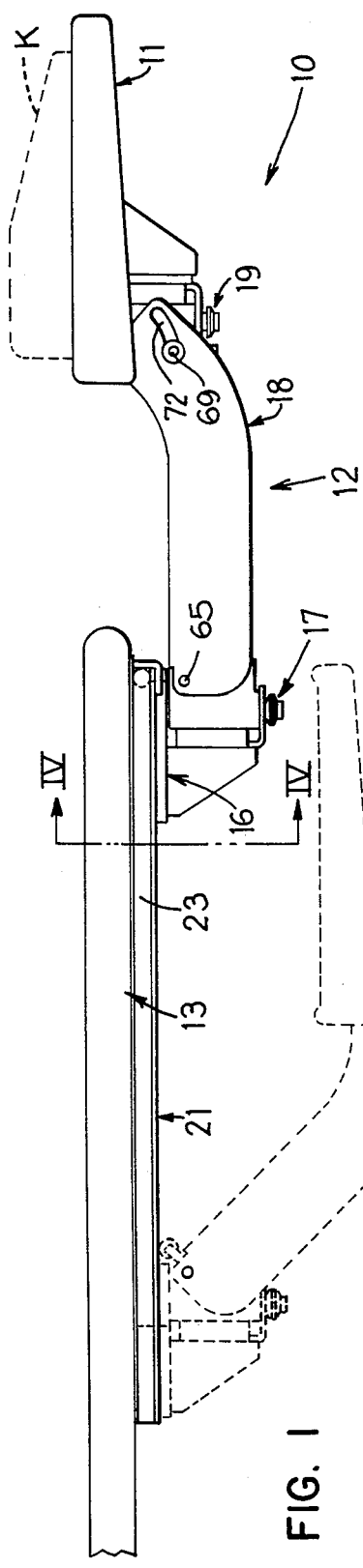
FIG. 1 is a side elevational view illustrating the improved auxiliary work surface assembly of this invention as mounted on a conventional primary work surface. The auxiliary work surface is shown in solid lines in its use position, and in dotted lines in its storage position.

Certain terminology will be used in the following description for convenience in reference only and will not be limiting. For example, the words "upwardly", "downwardly", "rightwardly" and "leftwardly" will refer to directions in the drawings to which reference is made. The word "upwardly" will also refer to the conventional upper surface of the work surfaces. The word "inward" will refer to movement of the auxiliary work surface toward its storage position (leftwardly in FIGS. 1 and 2), and conversely "outwardly" will refer to movement away from the storage position (rightwardly in FIGS. 1 and 2). The words "inwardly" and "outwardly" will also refer to directions toward and away from, respectively, the geometric center of the assembly and designated parts thereof. Said terminology will include the words specifically mentioned, derivatives thereof and words of similar import.

DETAILED DESCRIPTION

Figure 2:
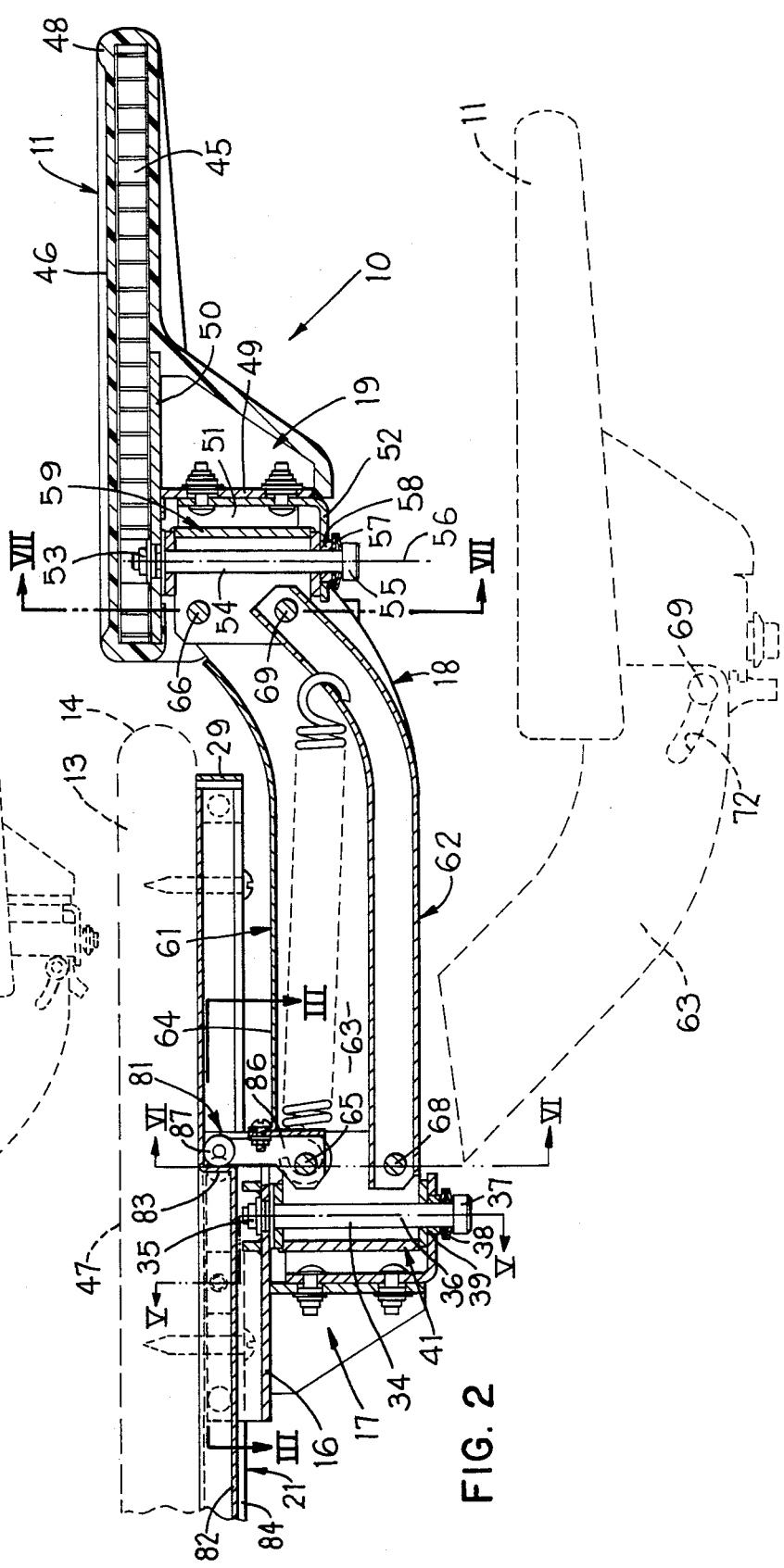
FIG. 2 is a sectional view similar to FIG. 1 but showing the auxiliary work surface assembly on an enlarged scale, and illustrating the auxiliary work surface in two different locations when in its use position.
Figure 3:
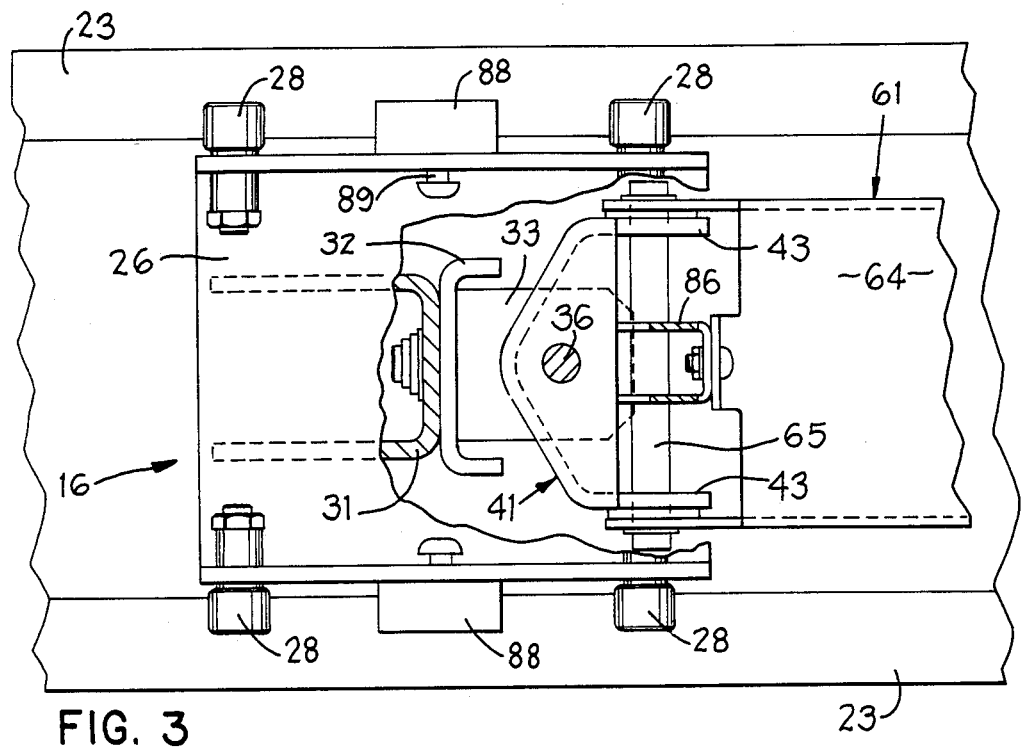
FIG. 3 is a fragmentary top view of the carriage assembly as taken substantially along the line III—III in FIG. 2.
Figure 4:
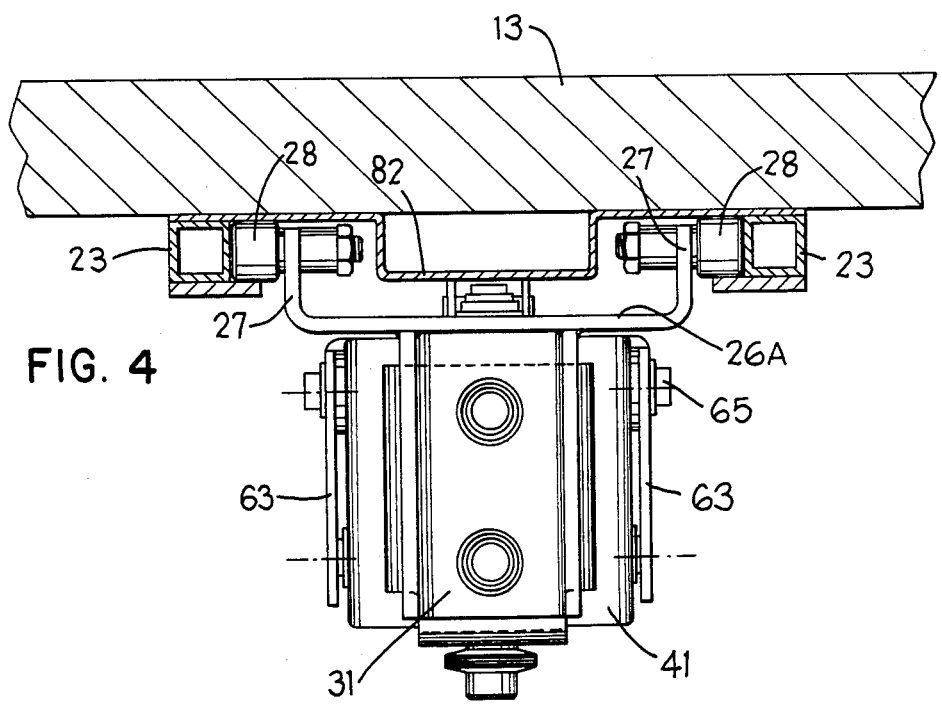
FIG. 4 is an end elevational view taken substantially along line IV—IV in FIG. 1.

Referring to FIGS. 1 and 2, there is illustrated an adjustable work surface assembly 10 according to the present invention. This assembly includes a shelflike auxiliary support 11 which is sized so as to enable it to comfortably support thereon a keyboard K as conventionally associated with a computer. This keyboard support 11 is interconnected by a support mechanism 12 to a conventional stationary work-surface support 13, the latter conventionally comprising the top of a table, desk or other similar work surface structure.

The work surface assembly 10 of this invention, and specifically the support mechanism 12 which interconnects the keyboard support 11 to the stationary support 13, provides the auxiliary support 11 with a wide range of movements relative to the primary support 13 so that the keyboard support 11 and the keyboard K thereon can be positioned for optimum user comfort while also providing maximum flexibility in terms of positional movement. Specifically, the support mechanism 12 enables the keyboard support 11 to be horizontally moved between an outer position wherein it is spaced a substantial distance forwardly from the front edge 14 of the stationary support 13, as illustrated in FIG. 1, and an inner position wherein this keyboard support 11 is disposed closely adjacent the front edge 14 of the stationary support 13, as illustrated by solid lines in FIG. 2. In addition, this support mechanism 12 enables the keyboard support 11 to be vertically displaced through a selected distance, such as between an upper position wherein the keyboard support 11 is approximately planar with the stationary support 13 as indicated by the solid line positions in FIGS. 1 and 2, and a lowered position wherein the keyboard support 11 is positioned vertically downwardly a substantial distance below the stationary support 13, as indicated by dotted lines in FIG. 2. This support mechanism enables the keyboard support to be positioned horizontally at any location between these inner and outer positions, and also vertically at any location between these upper and lower positions. Support mechanism 12 also enables the keyboard support 11 and the keyboard K mounted thereon, when the keyboard support 11 is in its lowermost position as indicated by dotted lines in FIG. 2, to be moved rearwardly into a storage position wherein the complete keyboard support and the keyboard K mounted thereon can be stored totally below the stationary support 13, this latter storage position being indicated by dotted lines in FIG. 1. In addition to these horizontal and vertical translatory movements of the keyboard support 11, the support mechanism 12 also includes appropriate hinge structures which enable the keyboard support 11 to be angularly tilted or displaced horizontally sidewardly relative to the work surface 13, substantially as indicated by dotted lines in FIG. 8, thereby providing the operator with greater flexibility over the position and control of the keyboard.

To provide the numerous movements and positional relationships briefly described above, the support mechanism 12 includes a carriage 16 which is slidably supported on the underside of the stationary support 13, which carriage mounts thereon a first vertical hinge assembly 17. This latter hinge assembly 17 in turn is connected to the rearward end of a link means 18, the latter being a vertical parallelogram linkage in the preferred embodiment, which at its forward end is connected to a second vertical hinge assembly 19 as mounted on the underside of the keyboard support 11.

Figure 6:
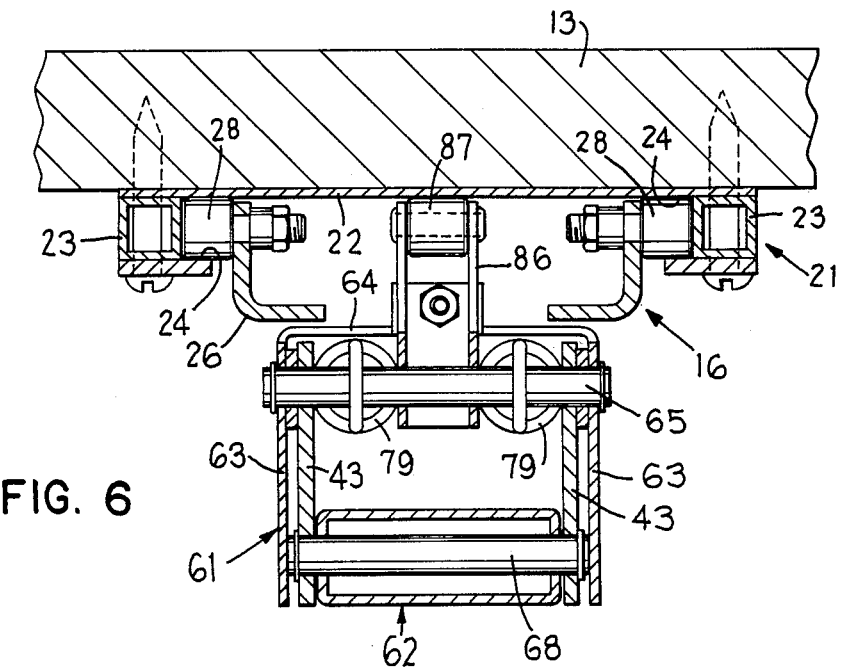
Figure 7:
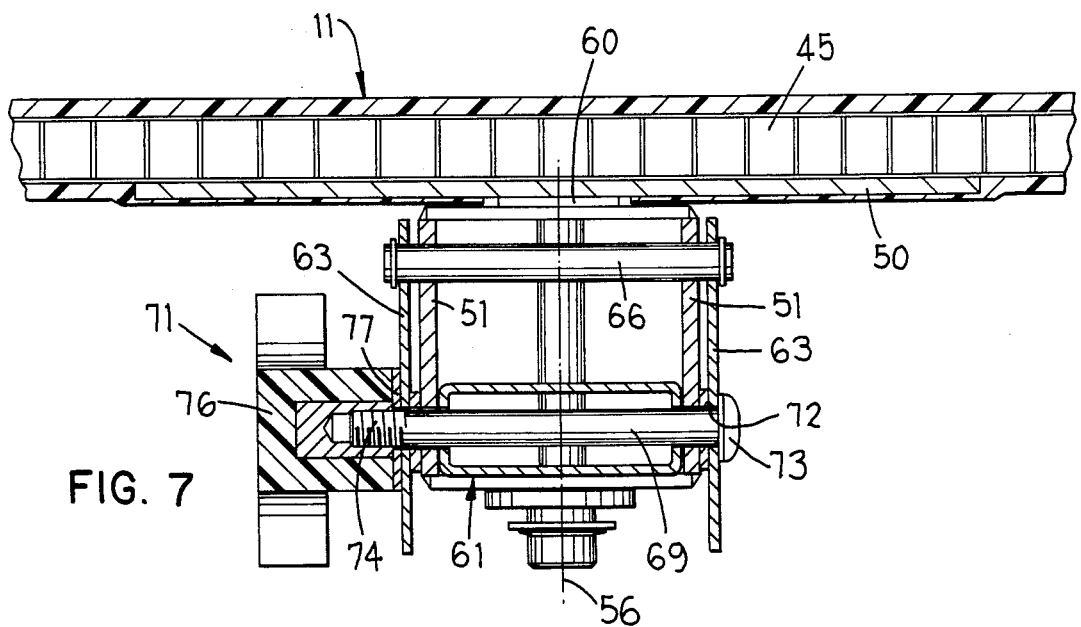

To movably and guidably support the carriage 16, the underside of the stationary support 13 has a guide rail means 21 fixed thereto. This guide rail means includes a base plate 22 (FIG. 6) secured to the underside of the support 13, and a pair of parallel guide rails 23 are fixed thereto and project rearwardly from a location adjacent the front edge 14 of the support 13 to a location more closely disposed adjacent the rearward edge thereof. These parallel rails 23, in cooperation with the base plate 22, define a pair of opposed, sidewardly opening guide channels 24. The forward ends of these guide channels are closed by an end or stop plate 29 which extends transversely thereacross in close proximity to the front edge 14.

The carriage 16 is rollingly supported on and confined by the guide rails 23, which carriage includes a shallow, upwardly opening channel or U-shaped member 26. The legs 27 of this member 26 project upwardly adjacent the channels 24, and these legs 27 mount thereon pairs of front and rear rollers 28 which are rollingly confined within the channels 24.

The structure of hinge means 17 will now be described. A U-shaped, rearwardly opening bracket 31 projects downwardly from the carriage plate 26 and is fixed thereto, such as by welding. This bracket 31 in turn mounts thereon an L-shaped hinge bracket 32, the latter defining a lower hinge plate 33 which is parallel with and spaced downwardly from the planar center portion 26A of the carriage member 26. A vertically elongated hinge shaft or pin 36 extends between these plates 26A and 33, the upper end of this hinge shaft 34 being threaded into a nut 35 which is fixed to the carriage plate 26. This hinge shaft 34, which defines a first vertical hinge axis 36, has an enlarged head 37 on the lower end thereof, and a plurality of spring washers 38 surround the shaft and are supported on the enlarged head 37, which spring washers 38 in turn react against an annular bushing 39, the latter being slidably supported on the shaft 34 and slidably supported within an enlarged opening formed in the hinge plate 33, whereby the bushing 39 is resiliently urged upwardly into engagement with an intermediate member 41 which is pivotally supported on the hinge shaft 34.

Figure 5:
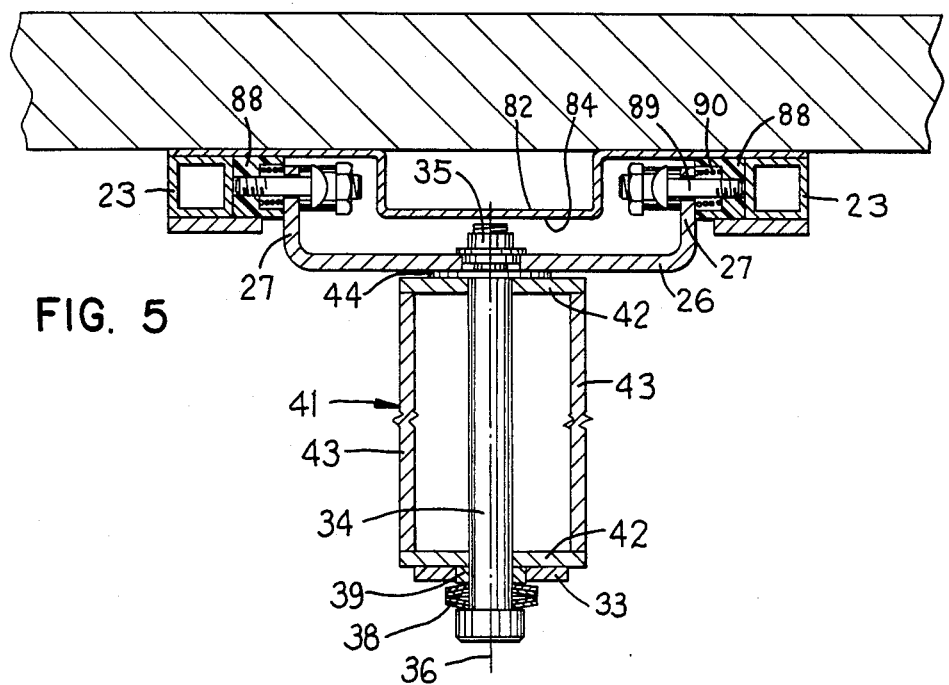
FIGS. 5, 6 and 7 are enlarged, fragmentary sectional views taken respectively along lines V—V, VI—VI and VII—VII in FIG. 2.

This pivotally supported intermediate member 41 includes parallel top and bottom walls 42 (FIG. 5) rigidly joined together by sidewalls 43. The resiliently urged bushing 39 bears against the bottom wall 42 so that the top wall 42 is hence maintained in engagement with a plastic support washer 44 which functions as part of a friction brake to normally prevent the horizontal pivoting of the intermediate member 41 within the stationary bracket structure about the vertical hinge axis 36.

Considering now the keyboard support 11, same is preferably formed of a plastics material which is suitably molded about a central core 45, whereby the keyboard support defines an upper planar surface 46 which is substantially horizontal and approximately parallel with the upper surface 47 of the stationary support 13. This formation of the keyboard support 11 also enables the support to be formed with a small upwardly projecting ridge 48 around the periphery thereof so as to reduce the possibility of the keyboard being accidentally pushed off of the support. The keyboard support 11 also has a support plate 50 fixedly molded in the underside thereof, which support plate 50 in turn has a vertical bracket plate 49 welded thereto and projecting downwardly therefrom. This latter bracket 49 in turn fixedly mounts thereon an L-shaped bracket 51 having a lower hinge plate 52 which is parallel with and spaced downwardly from the support plate 50. A hinge pin or shaft 54 extends vertically between the plates 50 and 52, and hence defines a second vertical hinge axis 56. The upper end of this hinge pin 54 is threadably anchored within a nut 53 which is fixed to the support plate 50, whereas the lower end of the hinge pin has an enlarged head 55 and spring washers 57 are mounted thereon and resiliently coact with an annular bushing 58 which is slidably supported on the hinge pin 54 and extends through an opening in the hinge plate 52 for engagement with the lower wall of an intermediate member 59 which is urged upwardly so that its upper wall engages the friction washer 60. The member 59 is substantially identical to the aforedescribed intermediate member 41 and is supported for pivoting movement on the hinge pin 54 about the vertical hinge axis 56 thereof. This latter-described structure hence defines the second vertical hinge assembly 19.

Considering now the link means 18, same includes elongated upper and lower links 61 and 62, respectively, disposed in substantially parallel relationship. The upper link 61 is, in the illustrated embodiment, of a downwardly opening U-shaped configuration and includes a pair of parallel vertical side legs 63 joined together by a top wall 64. The rearward end of this upper link 61 is hingedly joined to the intermediate member 41 by a horizontal hinge pin 65 which extends through the intermediate member sidewalls 43 and is supported on the link sidewalls 63, which latter sidewalls overlap the outer surfaces of the intermediate member sidewalls 43. A similar horizontal hinge pin 66 pivotally joins the forward end of link 61 to the other intermediate member 59.

The lower link 62, in the preferred embodiment, is of a tubular cross section and is sized so as to be totally confined between the sidewalls 63 of the upper link inasmuch as this provides the overall link means with a more streamlined appearance. Furthermore, the rearward end of this lower link 62 is also hingedly joined to the intermediate member 41 by a horizontal hinge pin 68 which extends through the lower link so that the opposite ends there of are appropriately supported on the intermediate member sidewalls 43. A similar horizontal hinge pin 69 joins the forward end of the link 62 to the other intermediate member 59. The links 61 and 62 are each of equal length, and the hinge pins 68 and 69 are equally spaced downwardly from the respective upper hinge pins 65 and 66, whereby the links 61 and 62 and their pivotal cooperation with the intermediate members 41 and 59 hence define a pivotally displaceable parallelogram linkage. This relationship hence enables the forward end of the linkage to be pivotally swung upwardly or downwardly, thereby causing a raising or lowering of the keyboard support 11, while at the same time maintaining the upper surface 46 of the keyboard support 11 substantially horizontal irrespective of the elevation thereof.

To enable the keyboard support 11 to be stationarily supported at any selected elevational position, the support mechanism has a lock means 71 associated therewith, which lock means 71 is provided at the outer end of the link means 18 so as to be readily accessible to the keyboard operator. This lock means 71 includes the lower outer hinge pin 69, which pin 69 is of increased length so as to project through elongated arcuate slots 72 formed in the sidewalls 63 of the upper link 61, which slots 72 are generated about the axis of the upper outer hinge pin 66 as a center. The hinge pin 69 projects through these arcuate slots 72 and has an enlarged head 73 at one end thereof, and a threaded end 74 at the other end thereof. A hand knob 76 is positioned adjacent the exterior side of the sidewall 63 and is threadably engaged with the threaded end 74 of the hinge pin 69, which hand knob 76 has the inner end of the hub thereof adapted to engage a friction washer 77 which surrounds the hinge pin and is clampable between the hub of the hand knob 76 and the sidewall 63.

When the parallelogram linkage 61-62 is vertically pivoted upwardly or downwardly, the hinge pin 69 is slidably moved along the arcuate slots 72, which hinge pin abuts the forward end of the slot so that the forward slot end thus acts as a stop and defines the lowermost elevational position of the keyboard support. Similarly, this hinge pin 69 abuts the rearward end of the slot 72 so that this rearward end hence acts as a stop for defining the uppermost elevational position of the keyboard support. In addition, when the hand knob 76 is manually rotated so as to snugly frictionally engage the friction washer 77 between the hand knob and the sidewall 63, this hence prevents the hinge pin 69 from being slidably displaced within the slot 72, thereby securely holding the parallel links 61 and 62 in a rigid relationship so that the keyboard support 11 is hence stationarily held in the selected elevational position.

The link means 18 also has spring means associated therewith for normally urging the keyboard support 11 into its uppermost elevational position. This spring means, in the illustrated embodiment, includes a pair of elongated tension springs 79 which are confined within the interior of the upper link 61, whereby one end of the springs 79 are anchored around the rear upper hinge pin 65, whereas the other ends of these springs 79 are anchored to the lower link 62, such as in the vicinity of the front hinge pin 69. These springs 79 hence continually bias the linkage 61-62 in a counterclockwise direction toward the uppermost elevational position of the keyboard support.

To define the normal inner and outer positional limits of the keyboard support 11 when the latter is in its use position, and at the same time to prevent the keyboard support from being moved into its storage position below the main support 13 except when the keyboard support is in its lowermost elevational position, the assembly 10 also includes a positional limit structure 81 coacting between the stationary support 13 and the support mechanism 12. This limit structure 81 includes an elongated control rail 82 which is fixed to the underside of the support surface 13 at a location between the guide rails 23, which control rail 82 projects forwardly from the rearward end of the guide rails and terminates at its forward end in a transverse stop surface 83. This top surface 83 is spaced rearwardly a substantial distance from the front edge 14, and in fact is spaced rearwardly a substantial distance from the front stop 29. The spacing between these stops 29 and 83 effectively defines and limits the permissible front-to-back horizontal displacement of the keyboard support 11 relative to the stationary support 13.

This limit structure 81 also includes a cooperating control or stop element associated with the support mechanism 12. In the preferred embodiment, this is provided by means of a bracket 86 which is secured to and projects upwardly from the upper link 61 adjacent the rearward end thereof, which bracket 86 in turn supports thereon a cam or stop in the form of a roller 87. This roller 87 is movable horizontally between and is adapted to abuttingly contact the opposed stop surfaces 83 and 29 for limiting the respective inner and outer positions of the keyboard support 11 so long as the latter is spaced slightly upwardly above its lowermost elevational position. Further, so long as the keyboard support 11 is spaced slightly upwardly above its lowermost elevational position, the roller 87 will abut the rear stop surface 83 and prevent the keyboard support 11 from being moved significantly under the stationary support 13. This thus prevents the keyboard support from being pushed inwardly a sufficient extent as to cause the keyboard K to strike the front edge 14.

However, when the keyboard support 11 is in its lowermost elevational position, then the roller 87 is disposed at an elevation whereby it will move rearwardly past the rear stop surface 83, and in fact this roller 87 will effectively rollingly move along the lower control surface 84 defined on the control rail 82, whereupon the keyboard support 11 and the keyboard K thereon can hence be moved rearwardly into a storage position located in its entirety below the stationary support 13. When in this lowermost elevational position, sufficient clearance exists for the keyboard K to be stored totally beneath the stationary support 13. Further, the engagement of the roller 87 with the control surface 84 hence maintains the keyboard support in this lowermost elevational position so as to permit safe storage of the keyboard K beneath the stationary support 13.

To restrict accidental displacement of the carriage 16 along the guide rails 23, the carriage additionally mounts thereon a friction brake which cooperates with the stationary base plate 22. This friction brake includes a friction brake block 88 (of plastics material) mounted on the carriage plate 26 and disposed in frictional sliding engagement with the guide rails 23 so as to permit linear displacement of the carriage only when the operator applies a substantial force to the assembly 10 so as to forcibly move the carriage and hence the keyboard support inwardly or outwardly relative to the stationary support. This friction brake is otherwise sufficient to stationarily hold the carriage in the selected position. The brake blocks 88 are mounted on the carriage legs 27 by pins 89, and springs 90 urge the brake blocks against the guide rails.

OPERATION

The operation of the adjustable work surface assembly 10 will be briefly described to insure a complete understanding thereof.

With the illustrated embodiment, the keyboard support 11 mounting thereon the keyboard K will normally be stored in the storage position indicated by dotted lines in FIG. 1, in which position the keyboard support 11 is in its lowermost elevational position and is retracted rearwardly so as to be disposed entirely below the work surface 13. In this storage position, the control roller 87 engages the control rail 82 and positively maintains the support 11 in this lowermost position, in opposition to the urging of the springs 79, so as to prevent the keyboard from being moved upwardly into engagement with the underside of the stationary support 13. When in this storage position, the hand knob 76 is normally loose so as to release the friction lock 71.

To use the keyboard, the operator will grasp the edge of the support 11 and slide the assembly 10 outwardly into a use position wherein the support 11 is positioned substantially in front of the stationary support 13. As the assembly 11 is manually moved outwardly toward the use position, the support 11 is maintained in its lowermost position until the support 11 reaches a position wherein the rear edge thereof is approximately vertically aligned with the front edge 14 of the support 13. At that point, the control roller 87 disengages the forward end of the control rail 82 and hence the springs 79 then resiliently urge the linkage 61-62 counterclockwise whereby the support 11 is swung upwardly into its uppermost position wherein the rear edge of support 11 is closely adjacent but spaced slightly from the front edge 14 of support 13, this uppermost use position being limited primarily by the engagement of the hinge pin 69 with the outer end of the arcuate slots 72. In this uppermost use position, the roller 87 is disposed substantially in engagement with the base plate 22. The operator can then horizontally position the keyboard support 11 relative to the stationary support 13 by pulling the support 11 further outwardly so as to increase the spacing thereof from the stationary support 13, which outward pulling is accompanied by corresponding displacement of the carriage 16, with the friction brake 88 then holding the carriage 16 stationary in the selected position. If desired, the operator can press downwardly on the support 11, thereby causing the linkage 61-62 to swing downwardly about the hinge pins 65-66 in opposition to the urging of the springs 79, which will cause a lowering of the support 11 while still maintaining the upper surface horizontal. The support 11 can thus be positioned elevationally either at or anywhere between the upper and lower elevational positions indicated in FIG. 2. When the support 11 is at the desired elevation, the operator will then manually grip the hand knob 76 and rotatably tighten same so that the friction lock 71 will be engaged, thereby preventing slidable displacement of the hinge pin 69 within the slots 72, and hence rigidly connecting the links 61 and 62 together so as to prevent pivoting movement thereof. This hence stationarily locks the keyboard support 11 at the selected elevation.

If desired, the keyboard support 11 can also be angularly displaced relative to the stationary support 13. This angular movement of keyboard support 11 can occur about either of the hinge axes 36 and 56. For example, the washer 60 functions as a friction brake (due to urging of spring washers 57) which coacts between the support 11 and intermediate member 59 for normally holding the support 11 stationary relative to the outer hinge axis 56. However, by exerting sufficient manual torque on the support 11, this friction brake can be overcome so that the support 11 can be manually pivoted about the outer vertical hinge axis 56 to permit angular orientation of the support about this latter axis, substantially as indicated by dash-dot lines in FIG. 8. Alternately, the desired angularity of the support 11 can be achieved solely by hingeably swinging the assembly about the inner vertical hinge axis 36. Again, the washer 44 creates a friction brake (due to urging of springs 38) which coacts between the carriage 26 and the intermediate member 41 for normally preventing pivoting movement about this axis 36, but the operator can again manually overcome this friction brake and angularly displace both the support 11 and the linkage 18 about this inner vertical axis 36.

Figure 8:
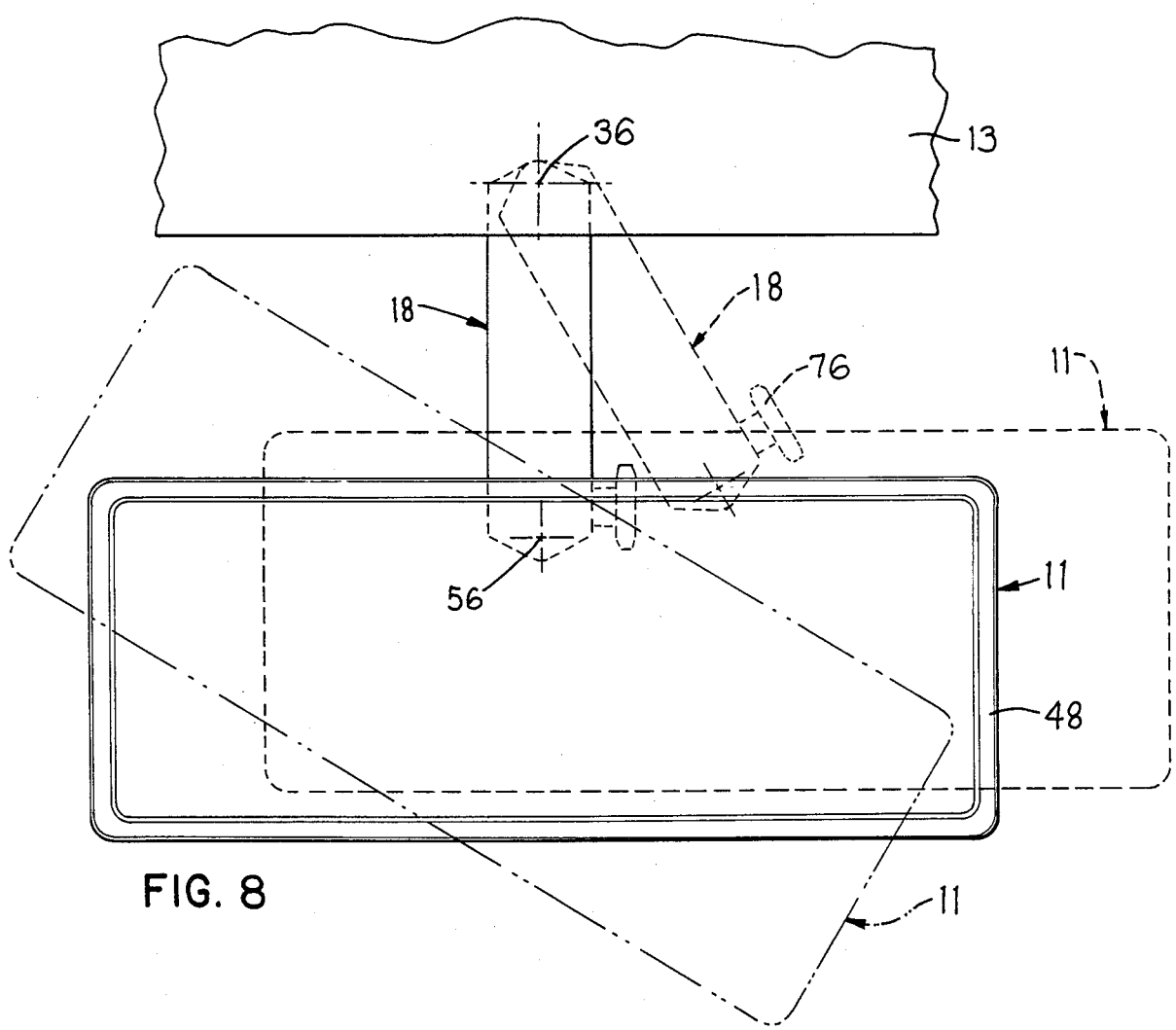
FIG. 8 is a fragmentary top view showing the auxiliary work surface relative to the primary work surface, and some of the different locations of the auxiliary work surface.

As still a further possibility, the operator can pivot the link means 18 in one rotational direction about the inner hinge axis 36, and can pivot the support 11 in the opposite rotational direction about the outer vertical hinge axis 56 so as to move the support 11 sidewardly or laterally relative to the stationary support 13 while still maintaining the support 11 substantially parallel with the front edge 14, this latter position being indicated by dotted lines in FIG. 8.

With the keyboard support 11 in its use position and at any elevation other than its lowermost position, any accidental inward movement of the keyboard support 11 toward the stationary support 13, such as due to someone inadvertently leaning against the front edge thereof, will be limited to movement into a position wherein the rear edge of the support 11 is adjacent or approximately vertically aligned with the front edge 14 inasmuch as the roller 87 will engage the perpendicular stop surface 83 and prevent any further inward movement, and hence prevent the keyboard K from striking the edge 14. The assembly can be moved into its storage position only by the operator first manually rotating the hand knob 76 so as to release the friction lock 71, following which the operator must then manually depress the support 11 into its lowermost use position as limited by the hinge pin 69 sliding along the slots 72 until the hinge pin contacts the rear ends of these slots, in which position the control roller 87 has been lowered below the stop surface 83 so as to permit the carriage 16 to then be rollingly moved rearwardly from the stop surface 83 into the rear storage position.

With the improved assembly 10 of this invention, it is anticipated that the support 11 when in its use position will have a permissible range of both elevational and horizontal displacement in the order of six to seven inches. However, this range of movement can obviously be increased or decreased depending on desired use conditions, although this range is believed satisfactory for most conventional keyboards. Further, with the improved assembly of this invention, the operator can very easily position the keyboard both elevationally and horizontally at whatever location the operator considers most desirable and comfortable for their own use and their own orientation relative to the CRT screen. In addition, in situations where more than one operator share a common keyboard and computer arrangement, the keyboard can be easily swung sidewardly so as to permit both angular and lateral displacement of the support 11 so that two operators can hence have easy access to the same keyboard.

The improved assembly 10 of this invention, in addition to the greatly improved flexibility and versatility thereof, can also be advantageously retrofitted onto many existing table tops or other stationary support surfaces so as to permit existing equipment to be easily and readily converted for use with computers without requiring purchase or installation of wholly specialized support tables or related equipment for this purpose.

In addition, the improved assembly of this invention can be easily and simply manually manipulated so as to enable it to accommodate the many different use positions and orientations, while at the same time the operator has to control only a single brake, namely by use of the hand knob 76, which knob is readily accessible and usable.

It will be recognized that, in many use situations, the improved assembly 10 of this invention can be associated with a narrower stationary support 13 which would be of insufficient width to permit movement of the keyboard support 11 into a storage position thereunder. Under these circumstances, the keyboard support would again be provided with the same support mechanism so as to provide the same types and range of movements when in the use position, although the shortening of the guide track due to the narrower stationary support 13 would necessarily prevent the keyboard support from being stored beneath the stationary support. In this situation, the guide rails 23 need be provided with a length only sufficient to accommodate the carriage 16 when the keyboard support 11 is in its innermost use position substantially as illustrated by FIG. 2, and hence this assembly 10 can thus be mounted on a rather narrow stationary support 13.

Figure 9:
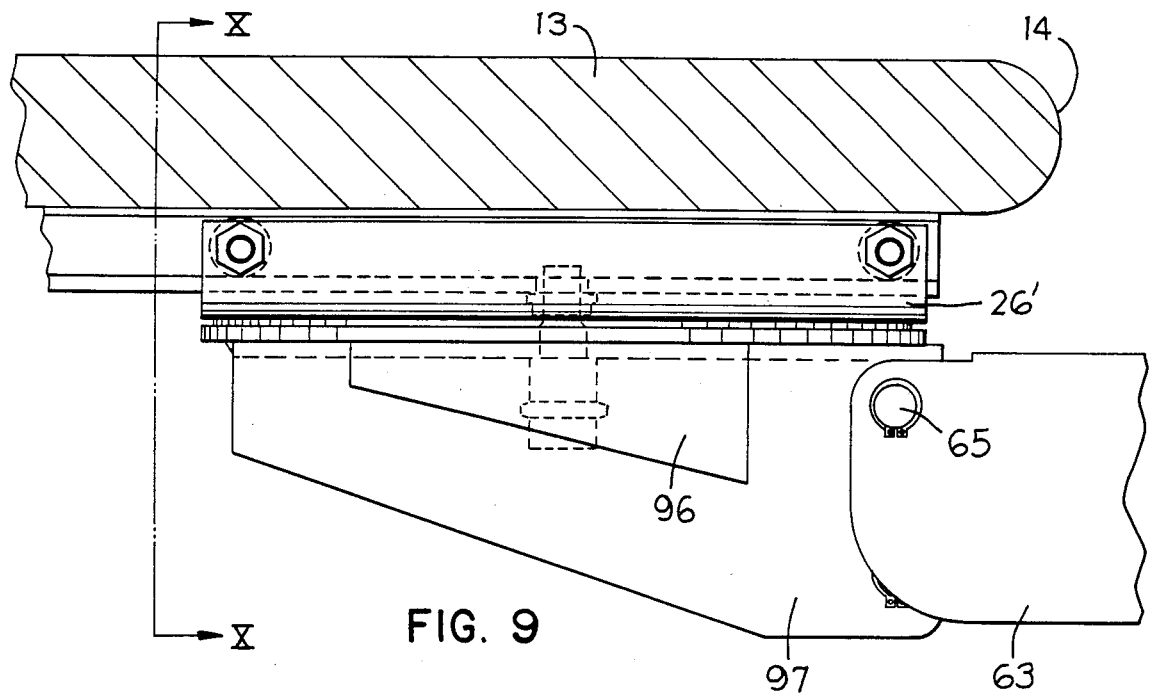
FIG. 9 is a fragmentary elevational view of a modification.
Figure 10:
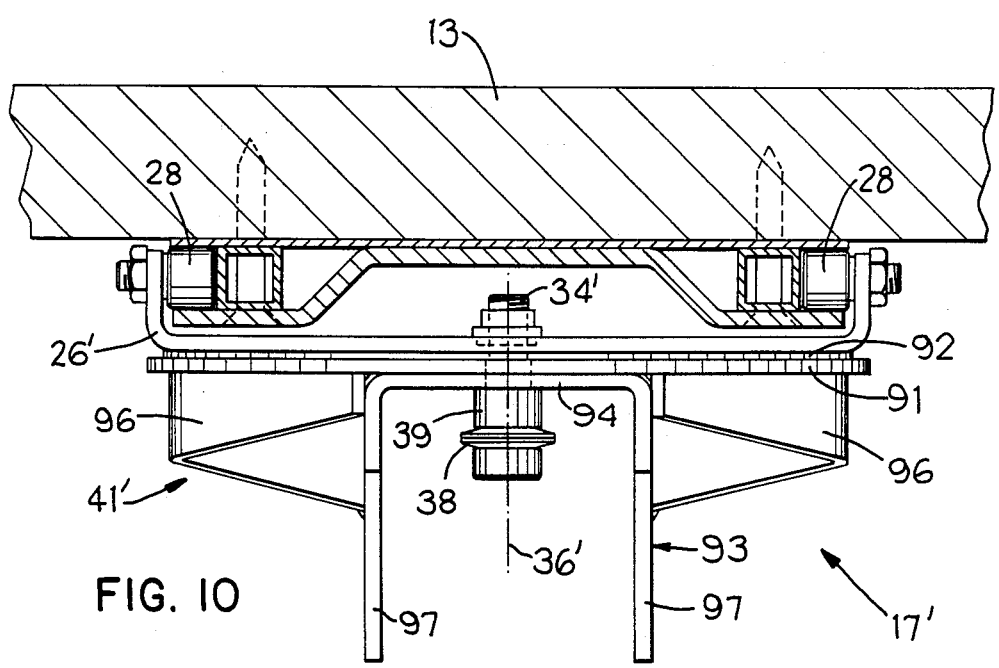
FIG. 10 is an end view of the modification shown in FIG. 9.

Referring now to FIGS. 9 and 10, there is illustrated a variation of the hinge means used for connecting the inner end of the link means 18 to the carriage 16. This variation of the inner hinge means, and the parts thereof, are designated by the same reference numerals utilized in FIGS. 1-7 except for the addition of a prime (') thereto.

The modified inner hinge assembly 17' shown in FIGS. 9 and 10 is designed so as to greatly increase the permissible angular displacement of the work surface assembly about the vertical axis 36', and in fact is designed to permit the work surface assembly to be rotated through 360° about this inner hinge axis 36'. For this reason, the inner hinge pin 34' is again fixed to and projects vertically downwardly in a cantilevered fashion from the center portion of the carriage plate 26'. The intermediate member 41' is rotatably supported on the hinge pin 34' directly below the carriage plate 26' so as to be rotatable about the axis 36'. This intermediate member 41', in the illustrated embodiment, includes a top swivel plate 91 which is positioned directly below the underside of the carriage plate 26', with a suitable friction pad 92 being provided on the plate 91 for frictional engagement with the carriage plate 26'. Intermediate member 41' also includes a downwardly opening, U-shaped part 93 which has the upper wall 94 thereof abutted against the swivel plate 91 and rotatably surrounding the hinge pin 34'. The swivel plate 91 has appropriate reinforcing brackets 96 which are fixedly engaged to the opposite legs or sidewalls 97 of the part 93. These latter sidewalls 97 function the same as the side legs 43 of the intermediate member 41 described above, and hence hingedly connect to the inner ends of the links 61 and 62 by means of the hinge pins 65 and 68.

With the arrangement illustrated by FIGS. 9 and 10, the work surface assembly hence can be rotatably swivelled about the inner vertical hinge axis 36' through 360° if necessary. Thus, if the assembly is mounted on a narrow table, the assembly can be swung about the axis 36' so as to position the support 11 adjacent either side of the table at intervals spaced 180° apart, or adjacent an end edge of the table.

As still a further modification of the present invention, the guide rail means 21 can be mounted on the underside of the stationary support 11 so as to extend parallel with the free edge 14 (rather than perpendicular thereto as illustrated by FIGS. 1 and 2). Hence, with the guide rail means 21 extending parallel to the support edge 14, and with the link means 18 extending perpendicular to the direction of movement along the rail means so as to position the support 11 adjacent a free edge of the stationary support 13, then the complete assembly can hence be moved laterally a substantial distance along the edge of the work surface so that the keyboard can be moved from one work station to another, thereby easily permitting two different operators to have convenient access to and utilize the keyboard without leaving their individual work stations.

When the assembly utilizes a hinge means of the type illustrated by FIGS. 9 and 10, then the support 11 is preferably provided with a stop fixed to and projecting upwardly therefrom adjacent the rearward edge thereof, which stop is of selected height so as to contact the edge 14 and prevent the support 11 from being moved into a position below the stationary support 13. This latter stop has a height which will permit it to pass under the support 13 only when the support 11 is in its lowermost elevational position so as to insure proper clearance for the keyboard when it is moved rearwardly into a position below the table.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, a primary support defining thereon an enlarged upwardly facing primary work surface, said primary support defining a front edge adjacent said primary work surface, an auxiliary shelflike support defining thereon an upwardly facing auxiliary work surface for supporting a keyboard unit thereon, and mounting means connecting said primary and auxiliary work supports together for movably supporting said auxiliary support relative to said primary support in the vicinity of said side edge, the improvement wherein said mounting means comprises:

carriage means positioned under and movably mounted on the underside of said primary support for linear horizontal translation of said carriage means relative to said primary support along a direction which extends substantially transverse to said front edge;

first means positioned under said primary support and mounted on said carriage means for pivotal movement relative thereto about a first substantially vertical hinge axis;

second means mounted on the underside of said auxiliary support for pivotal movement relative thereto about a second substantially vertical hinge axis;

vertically swingable, elongated link means having the opposite ends thereof pivotally connected to said first and second means for permitting vertical displacement of the auxiliary support relative to the primary support while maintaining said auxiliary support oriented so that the upper surface thereof retains its predetermined upwardly facing orientation, said link means comprising a vertical parallelogram linkage with elongated upper and lower links having their rearward ends pivotally interconnected to said first means and their forward ends pivotally interconnected to said second means;

spring means associated with said link means for exerting a biasing force tending to swing said link means upwardly to effect raising of said auxiliary support; and holding means including a manually movable actuator for preventing vertical pivotal displacement of said parallelogram linkage.

2. A combination according to claim 1, wherein said parallelogram linkage includes a pair of parallel but sidewardly spaced upper links having their rearward ends pivotally connected to said first means at a first horizontal hinge axis and having their forward ends pivotally connected to said second means at a second horizontal hinge axis, said parallelogram linkage including a pair of substantially parallel and sidewardly spaced lower links having their rearward ends hingedly connected to said first means at a third horizontal hinge axis and having their forward ends hingedly connected to said second means at a fourth horizontal axis, said parallelogram linkage including an elongated top wall which extends between and is substantially fixed to the upper edges of said upper links so that said upper links and said top wall define an elongated downwardly opening channel-shaped member, said lower links being positioned substantially within said channel-shaped member, and said spring means being disposed so as to extend at least partially along and within said channel-shaped member, said spring means having one end thereof anchored in the vicinity of the rearward ends of said links and the other end thereof anchored at a location spaced longitudinally along said channel-shaped member at a substantial distance from said rearward ends.

3. A combination according to claim 2, wherein an elongated bottom wall extends between and is fixed to the lower edges of the lower links to define an elongated upwardly opening channel-shaped member which nests within the downwardly opening channel-shaped member, the spring means being confined between the channel-shaped members.

4. A combination according to claim 2, wherein the holding means includes a friction brake which coacts with said links to prevent vertical pivotal displacement of said parallelogram linkage.

5. A combination according to claim 2, including first stop means cooperating with said carriage means for limiting the horizontal translation thereof relative to said primary support between an outer use position wherein the auxiliary support is disposed so that its rear edge is adjacent or spaced horizontally outwardly from the front edge of said primary support and an inner storage position wherein the auxiliary support and a keyboard thereon are disposed substantially directly below said primary support, said link means permitting said auxiliary support to be swingably vertically displaced between a raised use position wherein the auxiliary support is disposed adjacent but outwardly from the front edge of said primary support and a lowered storage position wherein the auxiliary support is spaced downwardly a substantial distance below the underside of said primary support, the spacing between said raised use position and said lowered storage position being substantially greater than the thickness of said auxiliary support to permit said auxiliary support and a keyboard thereon to be stored beneath said primary support, and second stop means for preventing horizontal rearward movement of said auxiliary support from the outer use position toward the inner storage position except when the auxiliary support is in said lowered storage position or in close proximity thereto.

6. A combination according to claim 5, including hold-down means for maintaining said auxiliary support in said lowered storage position whenever said auxiliary support is in said inner storage position or in close proximity thereto.

7. A combination according to claim 1, including first stop means cooperating with said carriage means for limiting the horizontal translation thereof relative to said primary support between an outer use position wherein the auxiliary support is disposed so that its rear edge is adjacent or spaced horizontally outwardly from the front edge of said primary support and an inner storage position wherein the auxiliary support and a keyboard thereon are disposed substantially directly below said primary support, said link means permitting said auxiliary support to be swingably vertically displaced between a raised use position wherein the auxiliary support is disposed adjacent but outwardly from the side edge of said primary support and a lowered storage position wherein the auxiliary support is spaced downwardly a substantial distance below the underside of said primary support, the spacing between said raised use position and said lowered storage position being substantially greater than the thickness of said auxiliary support to permit said auxiliary support and a keyboard thereon to be stored beneath said primary support, and second stop means for preventing horizontal rearward movement of said auxiliary support from the outer use position toward the inner storage position except when the auxiliary support is in said lowered storage position or in close proximity thereto.

8. A combination according to claim 1, including first releasable brake means associated with said first means for normally preventing pivoting of said link means about said first vertical pivot axis, second releasable brake means coacting with said second means for normally preventing pivoting of said auxiliary support relative to said link means about said second vertical axis, and friction means coacting between said carriage means and said primary support for normally preventing horizontal translational movement therebetween.

9. A combination according to claim 1, wherein said carriage means permits horizontal linear translation of said auxiliary support relative to said primary support between (1) an inner storage position wherein the auxiliary support is disposed substantially directly under said primary support, (2) an outer use position wherein said auxiliary support is positioned entirely forwardly of the primary support so that the rear edge of the auxiliary support is spaced forwardly a substantial distance from the front edge of the primary support, and (3) an intermediate use position wherein the auxiliary support is still positioned in its entirety forwardly of said primary support but is disposed with its rear edge horizontally closely adjacent the front edge of the primary support, said link means permitting said auxiliary support to be swingably vertically moved between a raised use position wherein the auxiliary support is approximately horizontally aligned with the primary support and a lowered storage position wherein the auxiliary support is vertically spaced downwardly a substantial distance below the primary support to permit the auxiliary support and a keyboard thereon to be positioned substantially entirely below the primary support, and means effective when the auxiliary support is spaced upwardly from said lowered storage position for preventing inward movement of the auxiliary support from said intermediate use position toward said inner storage position without first requiring movement of said auxiliary support downwardly into said lowered storage position.

10. In combination, a primary support defining thereon an enlarged upwardly facing primary work surface, said primary support defining a front edge adjacent said primary work surface, an auxiliary shelflike support defining thereon an upwardly facing auxiliary work surface for supporting a keyboard unit thereon, and mounting means connecting said primary and auxiliary work supports together for movably supporting said auxiliary support relative to said primary support in the vicinity of said front edge, the improvement wherein said mounting means comprises:

first means positioned under and mounted on said primary support for pivotal movement relative thereto about a first substantially vertical hinge axis;

second means mounted on the underside of said auxiliary support for pivotal movement relative thereto about a second substantially vertical hinge axis;

vertically swingable, elongated link means having the opposite ends thereof pivotally connected to said first and second means for permitting vertical displacement of the auxiliary support relative to the primary support while maintaining said auxiliary support oriented so that the upper surface thereof remains substantially horizontal, said link means comprising a vertical parallelogram linkage with elongated upper and lower links having their rearward ends pivotally interconnected to said first means and their forward ends pivotally interconnected to said second means;

spring means associated with said link means for exerting a biasing force tending to swing said link means upwardly to effect raising of said auxiliary support; and holding means including a manually movable actuator for preventing vertical pivotal displacement of said parallelogram linkage.

11. A combination according to claim 10, wherein said parallelogram linkage includes a pair of parallel but sidewardly spaced upper links having their rearward ends pivotally connected to said first means at a first horizontal hinge axis and having their forward ends pivotally connected to said second means at a second horizontal hinge axis, said parallelogram linkage including a pair of substantially parallel and sidewardly spaced lower links having their rearward ends hingedly connected to said first means at a third horizontal hinge axis and having their forward ends hingedly connected to said second means at a fourth horizontal axis, said parallelogram linkage including an elongated top wall which extends between and is substantially fixed to the upper edges of said upper links so that said upper links and said top wall define an elongated downwardly opening channel-shaped member, said lower links being positioned substantially within said channel-shaped member, and said spring means being disposed so as to extend at least partially along and within said channel-shaped member, said spring means having one end thereof anchored in the vicinity of the rearward ends of said links and the other end thereof anchored at a location spaced longitudinally along said channel-shaped member at a substantial distance from said rearward ends.

12. A combination according to claim 11, wherein the holding means includes a friction brake which is positioned in the vicinity of the forward ends of said links to prevent vertical pivotal displacement of said parallelogram linkage, the manual actuator for said friction brake being disposed below said auxiliary support in the vicinity of the forward ends of said links.

13. A combination according to claim 12, including first releasable brake means associated with said first means for normally preventing pivoting of said link means about said first vertical pivot axis, and second releasable brake means coacting with said second means for normally preventing pivoting of said auxiliary support relative to said link means about said second vertical axis.

14. A combination according to claim 11, wherein an elongated bottom wall extends between and is substantially fixed to the lower edges of said lower links so that said lower links and said bottom wall define an elongated upwardly open channel-shaped member which nests within said downwardly opening channel-shaped member, said spring means being positioned between said channel-shaped members.

15. A combination according to claim 11, wherein said first means includes means for permitting said link means to pivot through substantially 360° about said first vertical hinge axis.

16. A support mechanism for movably supporting an auxiliary shelflike support on and relative to a primary support, the primary and auxiliary supports both defining thereon upwardly facing work surfaces, the support mechanism comprising:

elongated guide rail means adapted to be fixedly secured to the underside of said primary support, said guide rail means defining an elongated linear guideway which extends in a direction which is substantially perpendicular to a front edge of said work support;

carriage means movably supported on said guide rail means for linear reciprocating movement along said direction between an outer position wherein the carriage means is disposed under the primary support in the vicinity of the front edge thereof and an inner position wherein the carriage means is disposed under the primary support but is spaced rearwardly a substantial distance from the front edge thereof;

first means mounted on said carriage means for pivoting movement relative thereto about a first substantially vertical hinge axis;

second means adapted to be mounted to and project downwardly from the underside of said auxiliary support for permitting pivoting movement of said auxiliary support relative to said second means about a second substantially vertical hinge axis which is spaced transversely a substantial distance from said first vertical hinge axis;

elongated link means extending between and being vertically pivotally connected to said first and second means for permitting the auxiliary support as mounted on said second means to be vertically raised and lowered relative to the primary support while maintaining the upper surface of the auxiliary support substantially horizontal, said elongated link means comprising an elongated parallelogram linkage having elongated and parallel upper and lower links having their rearward ends horizontally pivotally connected to said first means and their forward ends horizontally pivotally connected to said second means; and spring means coacting with said elongated link means for normally urging same to vertically swing upwardly about the rearward ends of said links.

17. A mechanism according to claim 16, wherein said upper and lower links respectively define downwardly-opening and upwardly-opening channel-shaped members each having a pair of substantially parallel and sidewardly-spaced side legs, the upwardly-opening channel-shaped member being nested within the downwardly-opening channel-shaped member, and the spring means being disposed within and between the nested channel-shaped members.

18. A mechanism according to claim 16, including lock means cooperating with said link means for fixedly locking said links together to prevent vertical pivoting of said link means, said lock means including a manually-engageable actuating member positioned exteriorly of said link means.

19. In combination, a primary support defining thereon an enlarged upwardly facing primary work surface, the primary support having a front edge adjacent the primary work surface, an auxiliary shelflike support defining thereon an enlarged upwardly facing auxiliary work surface adapted for supporting a keyboard unit thereon, the auxiliary shelflike support having front and rear edges and spaced side edges so that the auxiliary support is of substantial sideward extent, and mounting means connecting said primary and auxiliary work supports together for movably supporting the auxiliary support relative to the primary support in the vicinity of the front edge of said primary support, the improvement wherein said mounting means comprises:

carriage means positioned under and movably mounted on the underside of said primary support for linear horizontal translation of said carriage means relative to said primary support along a direction which extends substantially perpendicularly with respect to the front edge of said primary support;

first means positioned under said primary support and mounted on said carriage means for pivotal movement relative to said carriage means about a first substantially vertical hinge axis;

second means mounted on the underside of said auxiliary support for pivotal movement relative thereto about a second substantially vertical hinge axis which is spaced a substantial distance from said first vertical hinge axis;

vertically swingable, elongated link means having the opposite ends thereof pivotally connected to said first and second means for permitting vertical displacement of the auxiliary support relative to the primary support while maintaining said auxiliary support oriented so that the upper surface thereof maintains its predetermined upwardly-facing orientation relative to the auxiliary support and is not changed due to the vertical swinging of the link means;

said link means comprising a pair of elongated and substantially parallel upper links disposed in adjacent but sidewardly spaced relationship, said pair of upper links having their rearward ends pivotally joined to said first means about a first substantially horizontal pivot axis, and having their outer ends pivotally joined to said second means about a second substantially horizontal pivot axis;

said link means including a pair of elongated and substantially parallel lower links disposed in adjacent but sidewardly spaced relationship and having their rearward ends pivotally joined to said first means about a third substantially horizontal pivot axis, and having their outer ends pivotally joined to said second means about a fourth substantially horizontal pivot axis;

each of said upper links being respectively positioned closely adjacent one of said lower links, and the sideward spacing between said pairs of upper and lower links being a small fraction of the overall sideward extent of said auxiliary support; and means for locking said link means to prevent vertical swinging thereof, said locking means including a manually-accessible locking member.

20. A combination according to claim 19, wherein said link means includes an elongated top wall which extends sidewardly between and is fixedly joined to the upper edges of said upper links for defining a channel-shaped member which opens downwardly and has said lower links positioned substantially therein.

21. A combination according to claim 20, including spring means associated with said link means for exerting a biasing force tending to swing said link means upwardly to effect raising of said auxiliary support, said spring means being positioned between said pair of upper links and below said top wall so as to be effectively hidden from view.

22. In combination, a primary work support defining thereon an enlarged upwardly facing primary work surface, the primary support having a front edge adjacent the primary work surface, an auxiliary shelflike support defining thereon an enlarged upwardly facing auxiliary work surface adapted for supporting a keyboard unit thereon, the auxiliary shelflike support having front and rear edges and spaced side edges so that the auxiliary support is of substantial sideward extent, and mounting means connecting said primary and auxiliary work supports together for movably supporting the auxiliary support relative to the primary support in the vicinity of the front edge of the primary support, the improvement wherein said mounting means comprises:

carriage means positioned under and movably mounted on the underside of said primary support for linear horizontal translation of said carriage means relative to said primary support along a direction which extends substantially perpendicularly with respect to the front edge of said primary support, said carriage means permits horizontal linear translation of said auxiliary support relative to said primary support between (1) an inner storage position wherein the auxiliary support is disposed substantially directly under said primary support, (2) an outer use position wherein said auxiliary support is positioned entirely forwardly of the primary support so that the rear edge of the auxiliary support is spaced forwardly a substantial distance from the front edge of the primary support, and (3) an intermediate use position wherein the auxiliary support is still positioned in its entirety forwardly of said primary support but is disposed with its rear edge horizontally closely adjacent the front edge of the primary support;

first means positioned under said primary support and mounted on said carriage means;

second means mounted on said auxiliary support and positioned below the underside thereof;

vertically swingable, elongated link means having the opposite ends thereof pivotally connected to said first and second means for permitting vertical displacement of the auxiliary support relative to the primary support while maintaining said auxiliary support oriented so that the upper surface thereof maintains its predetermined upwardly facing orientation relative to the primary support and is not changed due to the vertical swinging of the link means, said link means permitting said auxiliary support to be swingably vertically moved between a raised use position wherein the auxiliary support is approximately horizontally aligned with the primary support and a lowered storage position wherein the auxiliary support is vertically spaced downwardly a substantial distance below the primary support to permit the auxiliary support and a keyboard unit thereon to be positioned substantially entirely below the primary support, said link means also permitting the auxiliary support to be vertically moved into a partially lowered use position wherein the auxiliary support is vertically spaced downwardly only a small distance below said primary support such that the keyboard unit is approximately horizontally aligned with the front edge of said primary support but said auxiliary support is spaced upwardly from said lowered storage position;

said link means comprising a vertical parallelogram linkage including a pair of elongated and substantially parallel upper links disposed in adjacent but sidewardly spaced relationship, said pair of upper links having their rearward ends pivotally joined to said first means about a first substantially horizontal pivot axis and their outer ends pivotally joined to said second means about a second substantially horizontal pivot axis, the sideward spacing between said pair of upper links being a small fraction of the overall sideward extent of said auxiliary support, and an elongated lower link positioned sidewardly between said upper links and having its rearward end pivotally joined to said first means about a third substantially horizontal pivot axis and its outer end pivotally joined to said second means about a fourth substantially horizontal pivot axis;

stop means coacting between said link means and said primary support and effective when the auxiliary support is in said partially lowered and raised use positions for preventing inward movement of the auxiliary support from said intermediate use position toward said inner storage position so as to prevent the keyboard unit from being struck by the primary support, said stop means including a stop which is fixedly positioned adjacent the underside of said primary support and is spaced rearwardly from the front edge thereof, said stop means being ineffective when the auxiliary support is in said lowered storage position for permitting the auxiliary support to be slidably displaced into said inner storage position; and means for locking said link means at either of said end positions or at any intermediate position therebetween to prevent vertical swinging thereof, said locking means including a readily-accessible, manually-engageable locking member for controlling the locking and unlocking of said link means.

23. A combination according to claim 4, including first releasable brake means associated with said first means for normally preventing pivoting of said link means about said first vertical axis, and second releasable brake means coacting with said second means for normally preventing pivoting of said auxiliary support relative to said link means about said second vertical axis, each of said releasable brake means being of the friction type and releasable to permit pivoting upon application of sufficient torque thereto as to overcome the frictional braking torque of the brake means.

24. A combination according to claim 1, wherein said link means permits vertical swinging movement of said auxiliary support from a lowered position wherein this support is disposed downwardly a substantial distance below the primary work surface and a raised position wherein the auxiliary support is disposed adjacent the front edge of said primary support and is substantially horizontally aligned therewith so that said auxiliary support is positioned in its entirety outwardly from the front edge of said primary support, and said holding means being manually engageable for locking the link means so as to position the auxiliary support in either its raised or lowered position or at any intermediate position therebetween, said manually movable actuator being positioned adjacent and exteriorly of said link means so as to be readily manually accessible for engagement with the operator's hand.

25. A combination according to claim 24, wherein said spring means urges said auxiliary support to swing upwardly from said lowered position up to and into said raised position.

26. A combination according to claim 2, wherein said channel-shaped member has the parallel upper links thereof disposed in adjacent but sidewardly spaced relation so that the width of said channel-shaped member as defined by the spacing between said pair of upper links is a small fraction of the overall sideward extent of the auxiliary support, and said link means extending for attachment to said auxiliary support substantially midway along the sideward extent thereof.

27. A combination according to claim 10, wherein said first means defines solely a single said first vertical hinge axis for connection with said link means.

28. A combination according to claim 13, wherein said parallel upper links as defined on said channel-shaped member are sidewardly spaced apart by a distance which is only a small fraction of the sideward extent of said auxiliary support so that said auxiliary support projects sidewardly in opposite directions a substantial extent beyond said channel-shaped member.

29. A combination according to claim 16, including first releasable friction brake means associated with said first means for normally restricting rotation of said link means about said first vertical hinge axis except when the torque applied to the brake means is sufficient to effect release thereof, and second releasable friction brake means associated with said second means for normally preventing rotation of said auxiliary support relative to said link means about said second vertical axis except when the torque applied to the brake means is sufficient to effect the release thereof, and manually releasable holding means cooperating with said link means for permitting said link means to be fixedly secured at any selected angular position relative to said primary support, said holding means including a manually engageable handle member positioned exteriorly of said link means.

30. A combination according to claim 19, including releasable friction brake means associated with each of said first and second vertical axes for normally preventing relative rotation thereabout.

31. In combination, a primary support defining thereon an enlarged upwardly facing primary work surface, the primary support having a front edge adjacent the primary work surface, an auxiliary shelflike support defining thereon an enlarged upwardly facing auxiliary work surface adapted for supporting a keyboard unit thereon, the auxiliary shelflike support having front and rear edges and spaced side edges so that the auxiliary support is of substantial sideward extent, and mounting means connecting said primary and auxiliary work supports together for movably supporting the auxiliary support relative to the primary support in the vicinity of the front edge of the primary support, the improvement wherein said mounting means comprises:

carriage means positioned under and movably mounted on the underside of said primary support for linear horizontal translation of said carriage means relative to said primary support along a direction which extends substantially perpendicularly with respect to the front edge of said primary support;

first means positioned under said primary support and mounted on said carriage means;

second means mounted on said auxiliary support and positioned below the underside thereof;

vertically swingable, elongated link means having the opposite ends thereof pivotally connected to said first and second means for permitting vertical displacement of the auxiliary support between raised and lowered end positions relative to the primary support while maintaining said auxiliary support oriented so that the upper surface thereof maintains its predetermined upwardly facing orientation relative to the auxiliary support and is not changed due to the vertical swinging of the link means;

said link means comprising a vertical parallelogram linkage including a pair of elongated and substantially parallel upper links disposed in adjacent but sidewardly spaced relationship, said pair of upper links having their rearward ends pivotally joined to said first means about a first substantially horizontal pivot axis and their outer ends pivotally joined to said second means about a second substantially horizontal pivot axis, the sideward spacing between said pair of upper links being a small fraction of the overall sideward extent of said auxiliary support, an elongated lower link positioned sidewardly between said upper links and having its rearward end pivotally joined to said first means about a third substantially horizontal pivot axis and its outer end pivotally joined to said second means about a fourth substantially horizontal pivot axis, and an elongated top wall extending sidewardly between and fixedly joined to the upper edges of said upper links for defining a channel-shaped member which opens downwardly and has said lower link positioned substantially therein; and means for locking said link means at either of said end positions or at any intermediate position therebetween to prevent vertical swinging thereof, said locking means including a readily-accessible, manually-engageable locking member for controlling the locking and unlocking of said link means.

32. A combination according to claim 31, including elongated spring means positioned substantially within said channel-shaped member and coacting with said link means for normally urging same to swing upwardly about said first and second pivot axes toward said raised end position.

33. In combination, a primary support defining thereon an enlarged upwardly facing primary work surface, the primary support having a front edge adjacent the primary work surface, an auxiliary shelflike support defining thereon an enlarged upwardly facing auxiliary work surface adapted for supporting a keyboard unit thereon, the auxiliary shelflike support having front and rear edges and spaced side edges so that the auxiliary support is of substantial sideward extent, and mounting means connecting said primary and auxiliary work supports together for movably supporting the auxiliary support relative to the primary support in the vicinity of the front edge of the primary support, the improvement wherein said mounting means comprises:

carriage means positioned under and movably mounted on the underside of said primary support for linear horizontal translation of said carriage means relative to said primary support along a direction which extends substantially perpendicularly with respect to the front edge of said primary support;

first means positioned under said primary support and mounted on said carriage means;

second means mounted on said auxiliary support and positioned below the underside thereof;

vertically swingable, elongated link means having the opposite ends thereof pivotally connected to said first and second means for permitting vertical displacement of the auxiliary support between raised and lowered end positions relative to the primary support while maintaining said auxiliary support oriented so that the upper surface thereof maintains its predetermined upwardly facing orientation relative to the auxiliary support and is not changed due to the vertical swinging of the link means;

said link means comprising a vertical parallelogram linkage including a pair of elongated and substantially parallel upper links disposed in adjacent but sidewardly spaced relationship, said pair of upper links having their rearward ends pivotally joined to said first means about a first substantially horizontal pivot axis and their outer ends pivotally joined to said second means about a second substantially horizontal pivot axis, the sideward spacing between said pair of upper links being a small fraction of the overall sideward extent of said auxiliary support, and an elongated lower link positioned sidewardly between said upper links and having its rearward end pivotally joined to said first means about a third substantially horizontal pivot axis and its outer end pivotally joined to said second means about a fourth substantially horizontal pivot axis;

said first means being mounted on said carriage means for pivotal movement relative thereto about substantially vertical hinge axis means for enabling the link means and the auxiliary support mounted thereon to be horizontally angularly displaced relative to the primary support; and means for locking said link means at either of said end positions or at any intermediate position therebetween to prevent vertical swinging thereof, said locking means including a readily-accessible, manually-engageable locking member for controlling the locking and unlocking of said link means.

34. A combination according to claim 33, wherein said vertical hinge axis means defines only a single vertical hinge axis for connection to the rearward ends of said upper and lower links.

35. In combination, a primary support defining thereon an enlarged upwardly facing primary work surface, the primary support having a front edge adjacent the primary work surface, an auxiliary shelflike support defining thereon an enlarged upwardly facing auxiliary work surface adapted for supporting a keyboard unit thereon, the auxiliary shelflike support having front and rear edges and spaced side edges so that the auxiliary support is of substantial sideward extent, and mounting means connecting said primary and auxiliary work supports together for movably supporting the auxiliary support relative to the primary support in the vicinity of the front edge of the primary support, the improvement wherein said mounting means comprises:

carriage means positioned under and movably mounted on the underside of said primary support for linear horizontal translation of said carriage means relative to said primary support along a direction which extends substantially perpendicularly with respect to the front edge of said primary support;

first means positioned under said primary support and mounted on said carriage means;

second means mounted on said auxiliary support and positioned below the underside thereof, said second means being mounted on and projecting downwardly from the underside of said auxiliary support for pivotal movement relative thereto about a substantially vertical hinge axis for permitting horizontal angular displacement of said auxiliary support relative to said primary support;

vertically swingable, elongated link means having the opposite ends thereof pivotally connected to said first and second means for permitting vertical displacement of the auxiliary suport between raised and lowered end positions relative to the primary support while maintaining said auxiliary support oriented so that the upper surface thereof maintains its predetermined upwardly facing orientation relative to the auxiliary support and is not changed due to the vertical swinging of the link means;

said link means comprising a vertical parallelogram linkage including a pair of elongated and substantially parallel upper links disposed in adjacent but sidewardly spaced relationship, said pair of upper links having their rearward ends pivotally joined to said first means about a first substantially horizontal pivot axis and their outer ends pivotally joined to said second means about a second substantially horizontal pivot axis, the sideward spacing between said pair of upper links being a small fraction of the overall sideward extent of said auxiliary support, and an elongated lower link positioned sidewardly between said upper links and having its rearward end pivotally joined to said first means about a third substantially horizontal pivot axis and its outer end pivotally joined to said second means about a fourth substantially horizontal pivot axis; and means for locking said link means at either of said end positions or at any intermediate position therebetween to prevent vertical swinging thereof, said locking means including a readily-accessible, manually-engageable locking member for controlling the locking and unlocking of said link means.

36. In combination, a primary support defining thereon an enlarged upwardly facing primary work surface, the primary support having a front edge adjacent the primary work surface, an auxiliary shelflike support defining thereon an enlarged upwardly facing auxiliary work surface adapted for supporting a keyboard unit thereon, the auxiliary shelflike support having front and rear edges and spaced side edges so that the auxiliary support is of substantial sideward extent, and mounting means connecting said primary and auxiliary work supports together for movably supporting the auxiliary support relative to the primary support in the vicinity of the front edge of the primary support, the improvement wherein said mounting means comprises:

carriage means positioned under and movably mounted on the underside of said primary support for linear horizontal translation of said carriage means relative to said primary support along a direction which extends substantially perpendicularly with respect to the front edge of said primary support;

first means positioned under said primary support and mounted on said carriage means;

second means mounted on said auxiliary support and positioned under the underside thereof;

vertically swingable, elongated link means having the opposite ends thereof pivotally connected to said first and second means for permitting swinging vertical displacement of the auxiliary support between raised and lowered end positions relative to the primary support while maintaining the auxiliary support oriented so that the upper surface thereof maintains its predetermined upwardly facing orientation relative to the primary support and is not changed due to the vertical swinging of the link means;

said link means comprising a vertical parallelogram linkage including a first pair of elongated and substantially parallel links disposed in adjacent but sidewardly spaced relationship, said first pair of links having their rear ends pivotally joined to said first means about a first substantially horizontal pivot axis and their outer ends pivotally joined to said second means about a second substantially horizontal pivot axis, the sideward spacing between said first pair of links being a small fraction of the overall sideward extent of said auxiliary support, and a second pair of elongated and substantially parallel links disposed substantially between the links of said first pair and having their rearward ends pivotally joined to said first means about a third substantially horizontal pivot axis and their outer ends pivotally joined to said second means about a fourth substantially horizontal pivot axis, the pivot axes associated with said first and second pairs of links being respectively vertically spaced from one another to define said vertical parallelogram, and elongated top wall extending sidewardly between the upper edges of the links of the first pair for defining a channel-like configuration which opens downwardly and has the links of said second pair positioned substantially therein; and spring means coacting with said link means for normally urging same to swing upwardly about said first and third pivot axes from said lowered end position into said raised end position, said spring means being elongated generally in the lengthwise direction of said link means and disposed substantially within said channel-like configuration below said top wall.

37. A combination according to claim 36, wherein said link means includes an elongated bottom wall extending sidewardly between the lower edges of one of said pairs of links and cooperating with the top wall so as to define said channel-like configuration therebetween, said channel-like configuration being effectively closed by said top and bottom walls and confining said spring means therein.

38. A combination according to claim 37, wherein the link means is defined by upper and lower elongated channel-like members which open in opposed directions with the upper channel-like member opening downwardly and having the lower channel-like member nested within the upper channel-like member, the upper channel-like member defining the top wall and the outermost pair of links, and the lower channel-like member defining the bottom wall and the innermost pair of links.

* * * * *

(12) REEXAMINATION CERTIFICATE (4654th)

United States Patent
Smeenge et al.

(10) Number: US 4,616,798 C1
(45) Certificate Issued: Oct. 15, 2002

(54) ADJUSTABLE SUPPORT FOR CRT KEYBOARD

(75) Inventors: Paul A. Smeenge, Cascade Township, Kent County, MI (US); Harold R. Wilson, Holland Township, Ottawa County, MI (US); Randy P. Nelsen, Wyoming, MI (US)

(73) Assignee: Haworth, Inc., Holland, MI (US)

Reexamination Request:
No. 90/005,704, Apr. 15, 2000

Reexamination Certificate for:
Patent No.: 4,616,798
Issued: Oct. 14, 1986
Appl. No.: 06/706,231
Filed: Feb. 26, 1985

(21) Appl. No.: 06/706,231

Related U.S. Application Data

(63) Continuation of application No. 06/386,131, filed on Jun. 7, 1982, now abandoned.

(51) Int. Cl.[7] ............................... A47F 5/00
(52) U.S. Cl. ................... 248/281.11; 248/292.11; 248/279.1; 248/918; 108/69; 108/75; 312/27; 312/28
(58) Field of Search .................... 248/281.1, 293, 248/279; 108/69, 75; 312/27, 28

(56) References Cited

U.S. PATENT DOCUMENTS

| | | | | |
|---|---|---|---|---|
| 213,775 A | * | 4/1879 | Rednan et al. ........... | 248/281.1 |
| 491,610 A | * | 2/1893 | Stuck ...................... | 248/276 |
| 651,539 A | * | 6/1900 | Warren ................... | 248/276 X |
| 719,625 A | * | 2/1903 | Throm | |
| 934,861 A | * | 9/1909 | Vaaler | |
| 967,877 A | * | 8/1910 | Bauer ...................... | 248/281.1 |
| 973,325 A | * | 10/1910 | Waring .................... | 108/69 X |
| 1,013,943 A | * | 1/1912 | Kuenboldt ............... | 248/298 X |

(List continued on next page.)

FOREIGN PATENT DOCUMENTS

| | | |
|---|---|---|
| DE | 20 30 522 | 12/1971 |
| DE | 24 39 687 | 3/1976 |
| DE | 25 24 019 | 12/1976 |
| DE | 79 08 089 | 6/1979 |
| DE | 2847135 | * 5/1980 |
| DE | 29 46 593 | 5/1981 |
| EP | 0010491 | * 4/1980 |
| EP | 0038068 | * 10/1981 |
| EP | 0046225 | * 2/1982 |

OTHER PUBLICATIONS

Installation, Operation and Office Maintenance Manual for the Weber Wall Un–ette Model P–70, Dec. 1970, Publication No. SS1457–3 Entire Manual, The Weber Dental Manufacturing Company, Canton, OH.

(List continued on next page.)

*Primary Examiner*—Daniel P. Stodola

(57) ABSTRACT

An adjustable auxiliary work surface assembly which includes a shelflike auxiliary work surface which is suitably connected to one end of a linkage, specifically a parallelogram linkage. The other end of this linkage is in turn connected to a carriage which is suitably rollingly supported within horizontally elongated guide rails, the latter being fixedly secured to the underside of a primary work surface. The parallelogram linkage enables the auxiliary work surface to be vertically swung upwardly and downwardly. This parallelogram linkage has a manually actuated lock so that the operator can lock the linkage at any selected elevation of the auxiliary work surface. In addition, the carriage can be rollingly moved so as to position the auxiliary work surface in a desired use position adjacent the edge of the primary work surface. Vertical hinge structures are preferably provided adjacent the opposite ends of the linkage assembly so that the auxiliary work surface can be tilted relative to the primary work surface.

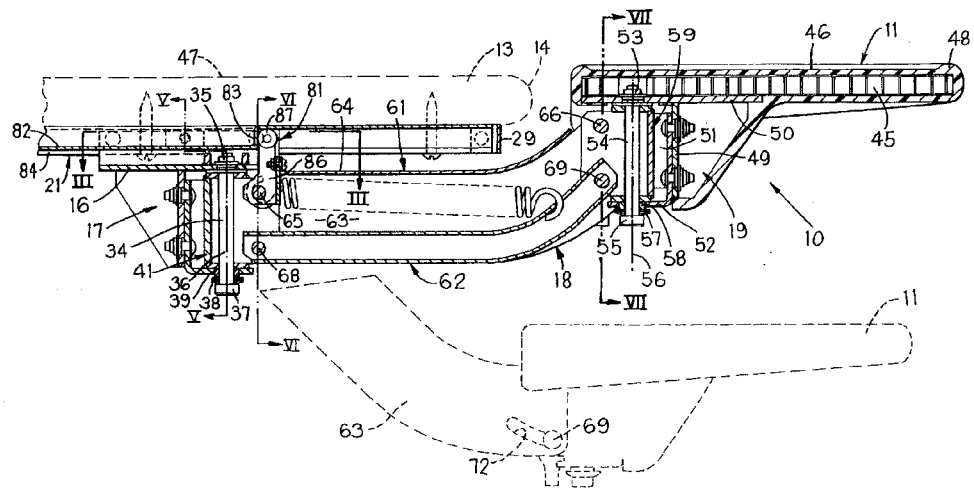

U.S. PATENT DOCUMENTS

| | | | | |
|---|---|---|---|---|
| 1,037,627 | A | * 9/1912 | Hunter | |
| 1,061,707 | A | * 5/1913 | Vaaler | |
| 1,072,121 | A | * 9/1913 | Hunter | |
| RE13,832 | E | * 11/1914 | Vaaler | |
| 1,122,372 | A | * 12/1914 | Duncan | |
| 1,392,744 | A | 10/1921 | Clough | |
| 1,480,484 | A | * 1/1924 | Wertz | 248/291 X |
| 1,532,715 | A | * 4/1925 | Petrarca | 108/75 |
| 1,606,975 | A | * 11/1926 | Tobey | |
| 1,893,624 | A | 1/1933 | Jay | |
| 1,929,048 | A | 10/1933 | Ash | 312/29 |
| 2,251,198 | A | * 7/1941 | Oneal | |
| 2,258,782 | A | 10/1941 | McKean | 311/10 |
| 2,287,577 | A | 6/1942 | Stava | 248/280 |
| 2,524,386 | A | * 10/1950 | Johnston | |
| 2,541,075 | A | * 2/1951 | Koch | |
| 2,678,862 | A | * 5/1954 | Paliuca | |
| 2,710,782 | A | * 6/1955 | Chaft | |
| 2,710,783 | A | * 6/1955 | Chaft | |
| 3,000,606 | A | 9/1961 | Storm | 248/284 |
| 3,003,838 | A | * 10/1961 | Chaft | |
| 3,122,348 | A | 2/1964 | Wilkinson | 248/281 |
| 3,160,379 | A | 12/1964 | Gardella | 248/124 |
| 3,237,902 | A | 3/1966 | Hayashi | 248/281 |
| 3,311,340 | A | 3/1967 | Riis | 248/284 |
| 3,409,261 | A | 11/1968 | Leporati | 248/281 |
| 3,425,761 | A | * 2/1969 | Schreyer | |
| 3,433,444 | A | 3/1969 | Smith | 248/279 |
| 3,436,046 | A | 4/1969 | Valeska | 248/284 |
| 3,516,343 | A | * 6/1970 | Tunney | 95/82 |
| 3,524,689 | A | 8/1970 | Wener | 312/208 |
| 3,530,513 | A | 9/1970 | Maurer | 32/22 |
| 3,550,976 | A | * 12/1970 | Rauser | |
| 3,652,143 | A | * 3/1972 | Wener | |
| 3,698,780 | A | 10/1972 | Collins | 312/245 |
| 3,717,111 | A | 2/1973 | Volberding | 108/45 |
| 3,762,051 | A | 10/1973 | Valeska | 32/22 |
| 3,891,301 | A | * 6/1975 | Heller | 350/85 |
| 4,082,244 | A | 4/1978 | Groff | 248/280 |
| 4,266,747 | A | 5/1981 | Souder | 248/280.1 |
| 4,382,642 | A | 5/1983 | Burdick | 312/194 |
| 4,402,481 | A | * 9/1983 | Sasaki | 248/276 |
| 4,447,031 | A | 5/1984 | Souder | 248/280 |

OTHER PUBLICATIONS

DE Berichte, Dental Echo, Feb. 1981, vol. 1, 1981, pp. 26–38 Helmut Haase Verlag, Heidelberg, Germany.

Dental Products Report, Doctor's Console, Jul./Aug. 1980, cover page, vol. 14, No. 7, Thomas D. Hoyt, DDS, Skokie, IL.

Cakir, A., Visual Display Terminals, 1980, pp. 159–163, John Wiley & Sons, Chichester, England.

Galitz, W.O., Human Factors in Office Automation pp. 80–81, 183–189, (Life Office Management Association, Atlanta, GA 1980).

Scenes from an International Fair, Modern Office Procedures, Feb. 1981, pp. 150–151, 155, vol. 26, No. 2, Penton Inc., Waseca, MN.

Weber Wall Un–ette P–70 sales brochure, 1968, The Weber Dental Manufacturing Co., Canton, OH.

Dental Equipment Catalog, 1968, The Weber Dental Manufacturing Co., Canton, OH.

Unitek Electronic Support by Haworth, 1982, Haworth Inc., Holland MI.

Paul, E., Ergonomics: The design of the dental surgery and its equipment, Oral Health, Aug. 1975, pp. 30–37, vol. 65, No. 8, Southam Business Publications Ltd., Don Mills, Ontario, Canada.

Sherwin A., Equipment for Low–seated Dentistry, The Dental Magazine, Dec. 1968, pp. 249–251, 261, vol. 85, No. 6, England.

Ernest J. McCormick, Human Factors Engineering, 2d Ed. pp. 362–377 (McGraw–Hill, Inc. 1964).

Interiors, Second Book of Offices 96–97, 183–185, 246–249, 252 (John Pile, ed., Whitney Library of Design 1969).

Judy Graf Klein, The Office Book, pp. 24–25, 38–39, 101, 114–115, 142–143 & 194–195 (John Smallwood, ed., Quarto Marketing, Ltd. 1982).

Pelton & Crane, The Exec–Aire, Proofs, Apr. 1980, unnumbered page (1980).

Advertisement, Gifts for Your Car, Motor Trend, Dec. 1953, p. 46, R. E. Petersen, Los Angeles, CA.

Ritter Super Starlite Dental Operating Light, 1980, Sybron Ritter Dental Products Division, Romulus, MI.

* cited by examiner

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–38 is confirmed.

* * * * *